(12) United States Patent
Richter

(10) Patent No.: US 9,174,685 B2
(45) Date of Patent: Nov. 3, 2015

(54) VEHICLE INTERIOR PARTITION

(71) Applicant: Adrian Steel Company, Adrian, MI (US)

(72) Inventor: Thomas S. Richter, Sand Creek, MI (US)

(73) Assignee: Adrian Steel Company, Adrian, MI (US)

( * ) Notice: Subject to any disclaimer, the term of this patent is extended or adjusted under 35 U.S.C. 154(b) by 0 days.

(21) Appl. No.: 14/636,521

(22) Filed: Mar. 3, 2015

(65) Prior Publication Data

US 2015/0246694 A1    Sep. 3, 2015

Related U.S. Application Data

(60) Provisional application No. 61/947,058, filed on Mar. 3, 2014.

(51) Int. Cl.
*B62D 33/00* (2006.01)
*B62D 33/04* (2006.01)

(52) U.S. Cl.
CPC .................................. *B62D 33/042* (2013.01)

(58) Field of Classification Search
CPC ........................... B60R 21/026; B62D 33/042
USPC ........................ 296/24.4, 24.41, 24.42, 24.43
See application file for complete search history.

(56) References Cited

U.S. PATENT DOCUMENTS 7,318,614 B2 * 1/2008 Steiger et al. ................ 296/24.4
8,052,191 B2 * 11/2011 Shea ........................ 296/24.43

* cited by examiner

*Primary Examiner* — Joseph D Pape
(74) *Attorney, Agent, or Firm* — Bill C. Panagos; Linda D. Kennedy; Butzel Long, PC

(57) ABSTRACT

In one embodiment, the present disclosure is a modular construction of at least one partition panel combined with a structural footer rail, at least one close out wing, at least one header panel, optional gaskets to provide sound deadening between the cargo side and the cab side of the vehicle interior, and a structural reinforcing hoop to provide rigidity to the partition structure and create a "box" structure to the partition.

9 Claims, 4 Drawing Sheets

VEHICLE INTERIOR PARTITION

CROSS-REFERENCE TO RELATED APPLICATION

This application claims priority to provisional patent application No. 61/947,058 filed on Mar. 3, 2014, which is hereby incorporated by reference in its entirety.

TECHNICAL FIELD

Commercial vehicles and some passenger vehicles have been adapted to include an interior compartment partition to isolate the vehicle operator cab portion from a designated cargo or passenger portion. Generally, this was achieved by securing the partition to the vehicle B pillar and a structural roof bow of the vehicle so that a rigid partition can be created that protects the vehicle cab from, in the case of commercial vehicles, shifts in cargo that may cause loads to move from the cargo area to the cab area, and in the case of passenger vehicles, such as, for example police vehicles, isolates the passengers from the officers so that the passengers can be transported with minimal risk to the officers.

There is an increasing complexity in the design of commercial and passenger vehicles. For example, with new vehicle safety systems, the B pillar has been used to store side impact air bags. In addition, side impact crash sensors and the accompanying control modules for such systems may also be stored in the B pillar. In the case of Lane Detection Systems, the B pillar is often utilized to store radar or lidar systems, as well as the accompanying control modules to provide alerts to the vehicle operator as necessary.

The wiring for vehicles has also increased in complexity. The roof bows, which used to provide structural support, and now used as conduits wherein wiring is run to power the safety systems and for other systems within the vehicle.

The use of the B pillars and the roof bows for safety systems and wiring conduits has greatly reduced their ease of use as mounting structures for cargo partition systems. Indeed, mounting a cargo area partition to the roof bow may risk damaging the wiring that runs through the roof bows. Moreover, attaching a partition directly to the B pillar may damage the safety systems stored therein and further may interfere with the deployment of air bags stored in the B Pillar.

There is a need for a cargo or vehicle compartment partition that is rigidly mountable to a vehicle and does not interfere with the wiring in the roof bows or in the safety systems that are stored in the B pillar.

In one embodiment, the present disclosure is a modular construction of partition panels combined with a structural footer rail, at least one close out wing, at least one header panel, optional gaskets to provide sound deadening between the cargo area and the operator area of the vehicle interior, and a structural reinforcing hoop to provide rigidity to the partition structure and create a "box" structure to the partition.

DETAILED DESCRIPTION

Figure 1:
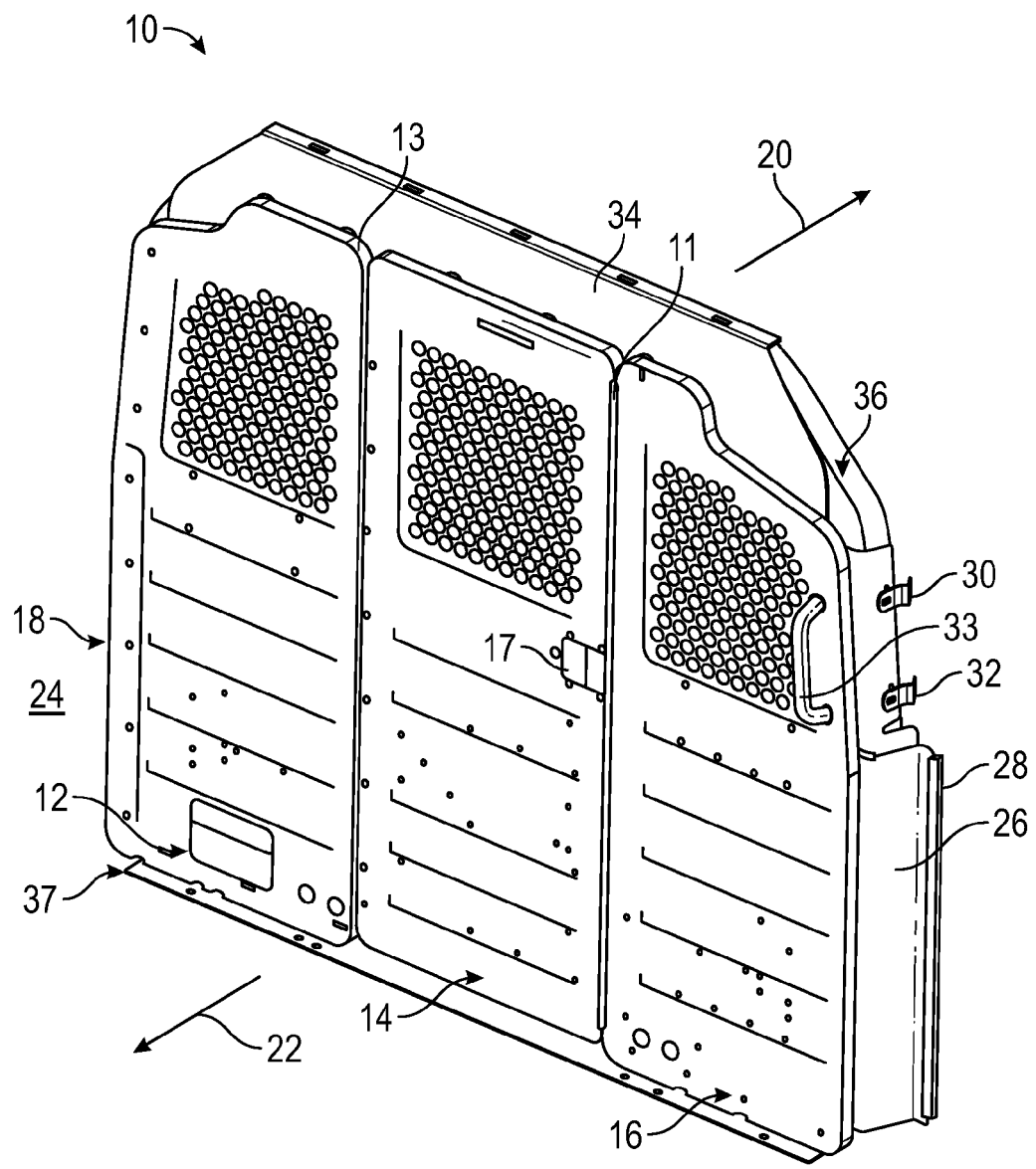
FIG. 1 is a front perspective view of one construction of a modular partition of the present disclosure.
Figure 2:
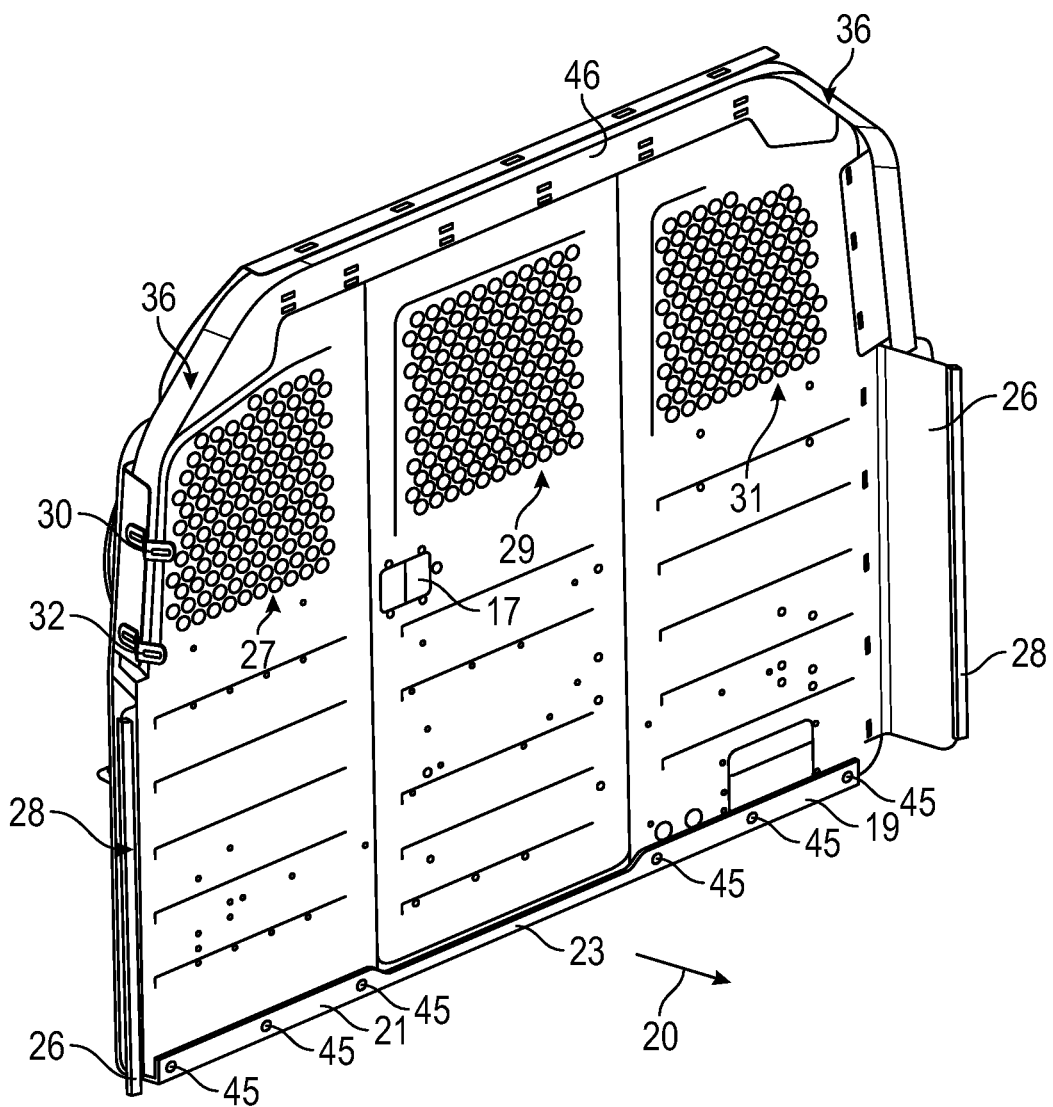
FIG. 2 is a rear perspective view of the modular partition of FIG. 1.
Figure 4:
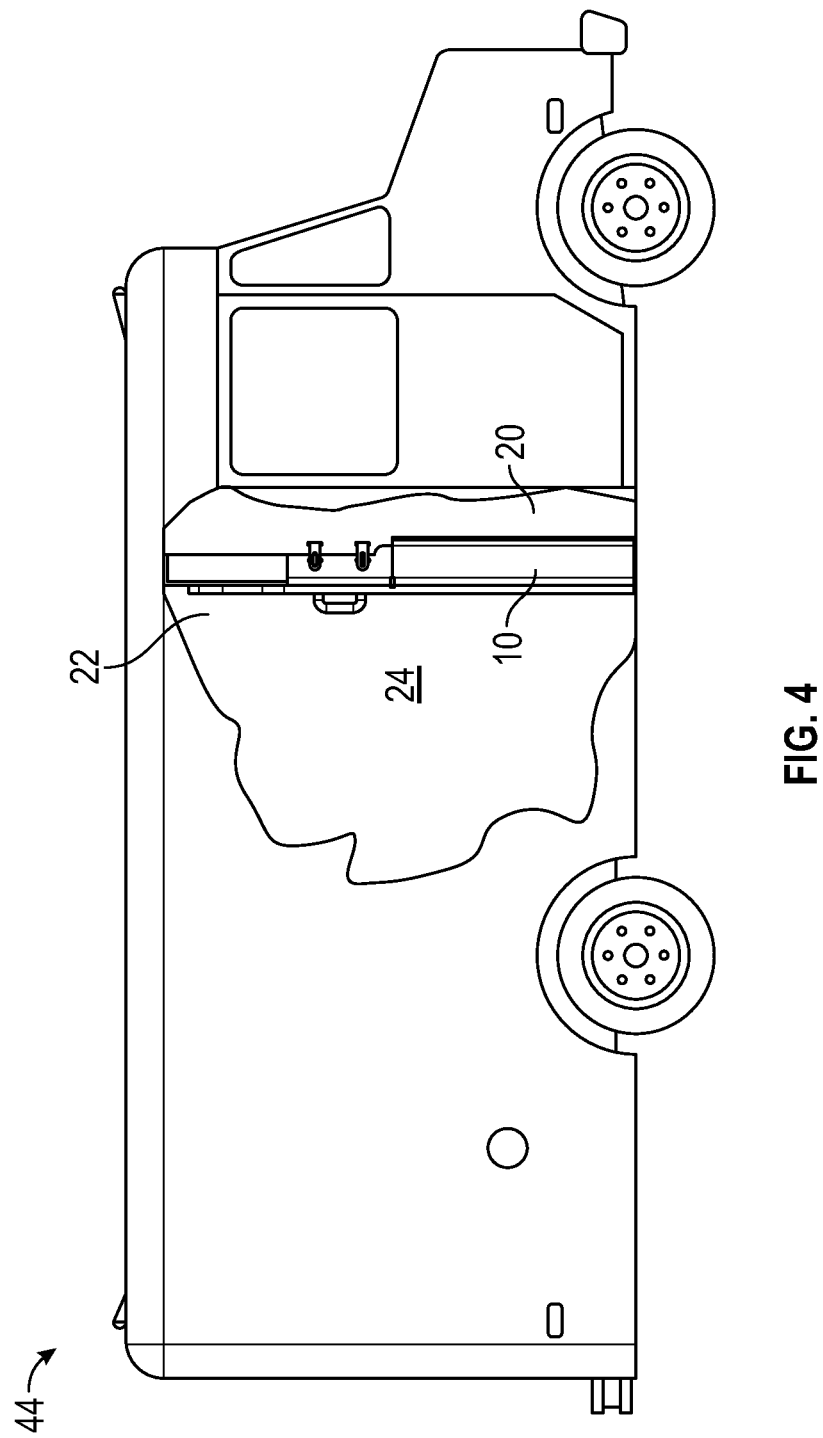
FIG. 4 is a cut away side view of a vehicle equipped with a modular portion system.

Turning now to the drawings wherein like numbers refer to like structures, and particularly to FIGS. 1, 2 and 4, FIG. 4 is a representation of vehicle 44 in cutaway view depicting a vehicle interior space 24 having a cargo partition system 10 separating the vehicle interior space 24 into a cargo side 22 and a cab side 20. FIGS. 1 and 2 depict a schematic representation of the modular cargo partition system 10 comprised of individual bulkhead partition panels 12, 14 and 16 as shown or an optional single bulkhead partition panel to create partition 18, mounted in a footer rail 37 to create the partition separating cab side 20 from cargo side 22 of a vehicle interior space 24.

The panels are configured to fit within the contours of the vehicle interior space of, for example, a vehicle 44 within which it is mounted. In that regard, if individual panels are utilized, panel 14 may be pivotally joined as by hinges 13 relative to panel 12 so that it is possible to open panel 14 about the hinges to permit access from the cab side to the cargo side. A stop 11 is provided at an edge of the panel 16 to limit the swing movement of the panel 14 about the hinge and permit the panel to rest against the stop when it is in the closed position. In the embodiment shown, the panel 14 may be swingably opened toward the cargo side 20. It follows that, in this configuration, stop 11 would have an orientation to accommodate that movement into the cargo area and stop movement of the panel into the cab section. However, it is also contemplated that panel 14 could be swingably opened into the cab side, depending upon the orientation of the hinge. A latch 17 is provided on the cab side of the panel 14 and on the cargo side of the panel. Any type of latch mechanism is contemplated as long as it can be opened to permit the panel to move about the hinge, and then latch the panel into place with the panel is closed. The panel 16 may be equipped with complimentary structure to engage the latch as may be well known to those skilled in the art. Note that the panel nearest the vehicle access door may further be equipped with a hand grip 33 to permit easier ingress and egress to the cargo space of the vehicle interior.

Turning to FIG. 2, the footer rail 37 is further adapted to accommodate the movement of the panel 14. Flanges 19 and 21 are provided to cooperatively engage panels 12 and 16, respectively. The flanges may be equipped with apertures 45 through which fasteners such as screws or bolts may be passed to affix panels 12 and 16 onto the footer rail 37. The footer rail further may have a sill 23 extending the width 25 of the panel 14 to permit ingress and egress through the partition when the panel 14 is opened.

The panels as shown have windows 27, 29 and 31 to permit air to flow between the cab portion and the cargo portion of the vehicle interior space. The windows also permit viewing between the cab portion and the cargo portion of the vehicle interior space.

The partition system as depicted may include at least one wing close out panel 26 that may include an optional gasket 28, and may further include attachment brackets 30, 32 to facilitate attachment of the structural rail 36 to the vehicle B pillar 48. The attachment of the wing(s) to the vehicle B pillar is especially important as the B pillar often stores safety systems such as air bags, lane detection equipment etc. The attachment flanges may interact with complimentary structures on the B pillar to permit the wing to be secured into place without disturbing the B pillar stored safety systems. A gasket may be interposed between the wing flange and the B pillar to help control noise etc when the wing is attached to the B pillar. The attachment of the wing to the B pillar may be accomplished by passing a suitable number of screw, bolts or other attachments through the flange apertures and into cooperation with complimentary structures such as apertures, bolts etc., in the B pillar.

The system further includes header closeout panel 34 to facilitate attachment of the bulkhead partition panels to the header panel and to the structural rail 36 in a manner that does not disturb the vehicle headliner 38 or the wiring that may be routed through the vehicle roof bow 40. The header close out panel is further equipped with flange 46 against which the panels 12 and 16 are secured, either by fasteners, screws, bolts etc., and against which panel 14 may rest if it is an openable partition or, if it is not openable, panel 14 may also be secured so that the entire partition is unitary and presents a boxlike structure when affixed to the B pillar.

The system is constructed in such a manner as to provide a box like structure for mounting in the vehicle. This is achieved by the cooperation of a footer rail and a structural reinforcing bow. The footer rail is attached to a vehicle floor by any suitable attachment such as screw or bolts. The bulkhead panels are mounted to a footer rail. The structural bow is secured to the attachment brackets. The attachment brackets are oriented along the structural bow so that attachment fasters such as screws, bolts etc passed through the attachment brackets engage complimentary structures in the vehicle roof bows, The cooperation of the footer rail, structural bracket and the panels creates a "box like" structure that may be mounted at any convenient space in the vehicle interior to separate the cab from the cargo area. The footer rail may be mounted to the floor where the risk of damaging safety systems is greatly reduced. The structural bow holds the panel system rigid such that the wing close out panels can be secured to the B Pillar and the header closeout can be secured to the structural rail 36 without disturbing the vehicle headliner or roof bow wiring routed therein.

Figure 3:
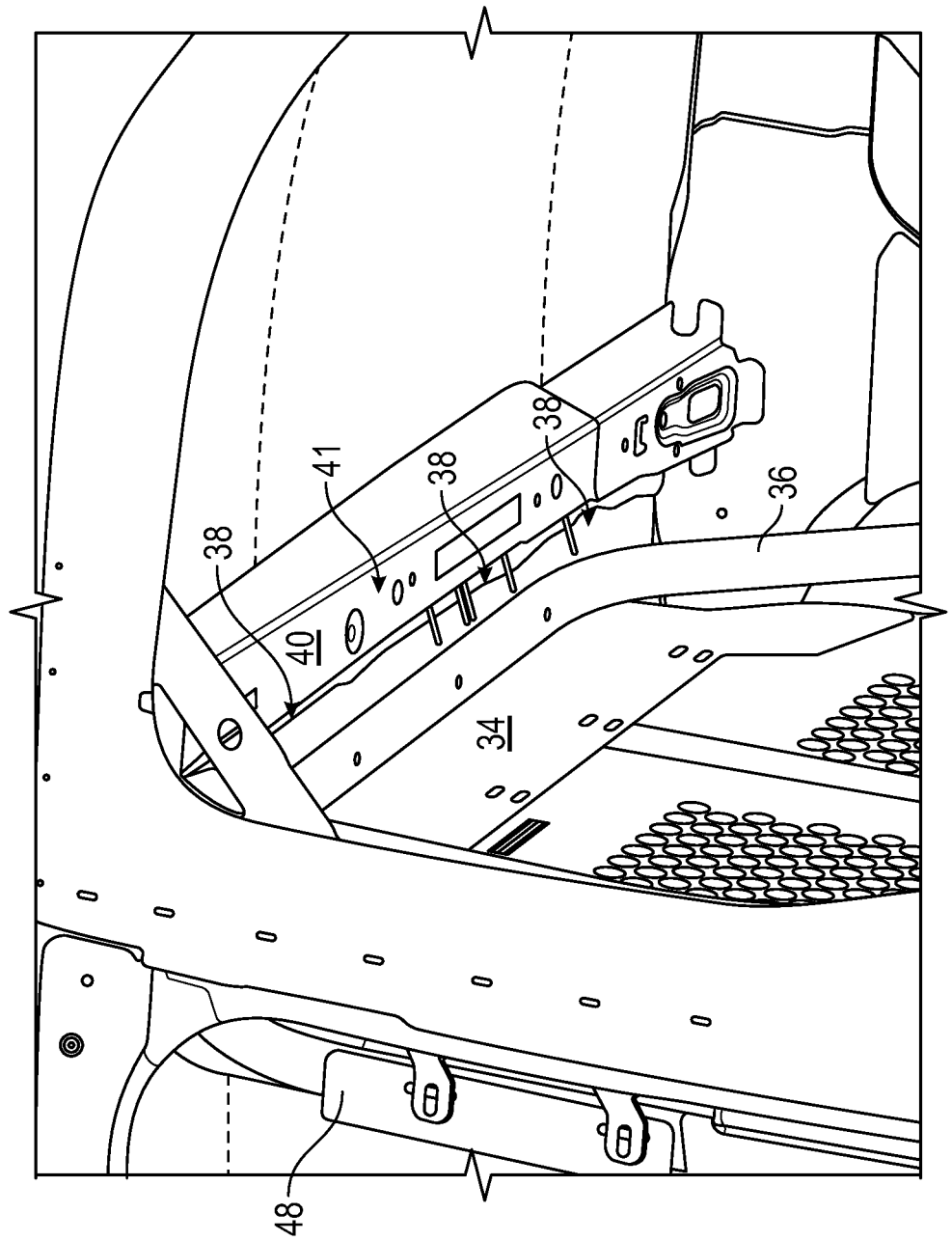
FIG. 3 is a detailed view of the modular partition of FIG. 1 showing the orientation of the partition to a vehicle roof bow.

FIG. 3 is a detailed cutaway view of a roof bow showing a no drill area 41 of the roof bow 40 and the vehicle headliner 38. Similarly, the wings may have apertures to fasten the wings to the vehicle structure without damaging the vehicle safety systems in the B Pillar.

While one embodiment has been shown, the words used in the specification are words of description and not words of limitation. Those skilled in the art understand that many variations and modification can be made without departing from the scope and sprit of the invention as set forth in the appended claims

What is claimed as new and desired to be protected by Letters Patent of the United States is:

1. A vehicle compartment partition system, comprising:
    a footer rail mountable to a vehicle interior compartment floor;
    at least one bulkhead partition mountable to said footer rail and of sufficient dimension to at least partially separate vehicle interior space into a cab portion and a cargo portion;
    a header close out panel attachable to a partition panel; and
    a structural reinforcing bow cooperatively engagable with said panel and said footer rail to create a partition system having a box like structure.

2. The vehicle compartment partition system of claim 1, wherein said bulkhead partition is comprised of multiple panels; at least one of said panels hingably affixed relative to an adjacent rigidly fixed panel for movement relative thereto to permit ingress and egress from said cab side to said cargo side of the vehicle interior.

3. The vehicle compartment partition system of claim 2, wherein said footer rail is equipped with a sill adjacent said hingably affixed panel, said sill having sufficient width to permit movement of the hingably affixed panel over the sill for hingable movement of the panel to permit ingress and egress between said cargo side and said cab side of said vehicle interior space.

4. The vehicle compartment partition system of claim 2, wherein said hingably affixed panel is further equipped with a latch mechanism to permit opening and closing said panel for ingress and egress.

5. The vehicle compartment partition system of claim 1, further including at least one close out wing having at least one attachment flange to affix said partition system to a vehicle B pillar.

6. The vehicle compartment partition system of claim 1, wherein said header close out panel is adapted to affix said partition system to a vehicle roof bow.

7. The vehicle compartment partition system of claim 1, wherein said floor rail is equipped with at least one flanged to cooperatively engage said partition panel and fix said panel in place with said floor rail to create a partition system having a box like structure.

8. The vehicle partition compartment system of claim 1, wherein said partition is comprised of multiple partition panels, each said partition panel having at least one window therethrough.

9. The vehicle partition compartment system of claim 1, wherein at least one panel is hingably attached to an adjacent panel and said footer rail is equipped with a sill of sufficient width to accommodate hingable movement of said hinged panel relative to said adjacent panel.

* * * * *